United States Patent Office 3,042,609
Patented July 3, 1962

3,042,609
PREVENTION OF CORROSION IN SYSTEMS CONTAINING A CORROSIVE AQUEOUS MEDIUM
William B. Hughes, Webster Groves, Mo., assignor to Petrolite Corporation, Wilmington, Del., a corporation of Delaware
No Drawing. Filed Oct. 9, 1959, Ser. No. 845,325
18 Claims. (Cl. 252—8.55)

This invention relates to the prevention of corrosion in systems containing a corrosive aqueous medium, and most particularly in systems containing brines.

More particularly, this invention relates to the prevention of corrosion in the secondary recovery of petroleum by water flooding and in the disposal of waste water and brine from oil and gas wells. Still more particularly, this invention relates to a process of preventing corrosion in water flooding and in the disposal of waste water and brine from oil and gas wells which is characterized by injecting into an underground formation an aqueous solution containing minor amounts of a reducing compound derived from the reaction of an aldehyde and an oxide of sulfur, and salts thereof, for example, $HOCH_2SO_2Na$ (hereafter sometimes referred to as "reducing compounds"), in sufficient amounts to prevent the corrosion of metals employed in such operation. This invention also relates to corrosion inhibited brine solutions of these reducing compounds.

When an oil well ceases to flow by the natural pressure in the formation and/or substantial quantities of oil can no longer be obtained by the usual pumping methods, various processes are sometimes used for the treatment of the oil-bearing formation in order to increase the flow of oil. These processes are usually described as secondary recovery processes. One such process which is used quite frequently is the water flooding process wherein water is pumped under pressure into what is called an "injection well" and oil, along with quantities of water, that have been displaced from the formation, are pumped out of an adjacent well usually referred to as a "producing well." The oil which is pumped from the producing well is then separated from the water that has been pumped from the producing well and the water is pumped to a storage reservoir from which it can again be pumped into the injection well. Supplementary water from other sources may also be used in conjunction with the produced water. When the storage reservoir is open to the atmosphere and the oil is subject to aeration this type of water flooding system is referred to herein as an "open water flooding system." If the water is recirculated in a closed system without substantial aeration, the secondary recovery method is referred to herein as a "closed water flooding system."

Because of the corrosive nature of oil field brines, to economically produce oil by water flooding, it is necessary to prevent or reduce corrosion since corrosion increases the cost thereof by making it necessary to repair and replace such equipment at frequent intervals.

I have now discovered a method of preventing corrosion in systems containing a corrosive aqueous media, and most particularly in systems containing brines, which is characterized by employing my reducing compounds therein.

I have also discovered an improved process of protecting from corrosion metallic equipment employed in secondary oil recovery by water flooding such as injection wells, transmission lines, filters, meters, storage tanks, and other metallic implements employed therein and particularly those containing iron, steel, and ferrous alloys, such process being characterized by employing in water flood operation an aqueous solution of reducing compounds derived from the reaction of aldehydes, preferably formaldehyde, and oxides of sulfur, and salts thereof, and most preferably formaldehyde sulfoxylic acids; and salts thereof. Because of its commercial availability, the preferred embodiments are the alkali metal salts (i.e. sodium, potassium, etc. salts) of formaldehyde sulfoxylic acids and specifically sodium formaldehyde sulfoxylate, $HOCH_2SO_2Na$. The invention, then is particularly concerned with preventing corrosion in a water flooding process characterized by the flooding medium containing an aqueous or an oil field brine solution of these reducing compounds.

In many oil fields large volumes of water are produced and must be disposed of where water flooding operations are not in use or where water flooding operations cannot handle the amount of produced water. Most States have laws restricting pollution of streams and land with produced waters, and oil producers must then find some method of disposing of the waste produced salt water. In many instances therefore, the salt water is disposed of by injecting the water into permeable low pressure strata below the fresh water level. The formation into which the water is injected is not the oil producing formation and this type of disposal is defined as salt water disposal or waste water disposal. The problems of corrosion of equipment are analogous to those encountered in the secondary recovery operation by water flooding.

The reducing compositions of this invention can also be used in such water disposal wells thus providing a simple and economical method of solving the corrosion problems encountered in disposing of unwanted water.

The reducing compositions useful in this invention include those derived from the reaction of aldehydes and the oxides of sulfur and salts thereof. Examples of these compositions include the aldehyde sulfoxylic acids,

wherein R is H or a hydrocarbon group such as alkyl, aryl, aralkyl, alkaryl, cycloalkyl, etc., but preferably hydrogen; and salts thereof. Since aldehyde sulfoxylic acids are unstable, salts thereof are employed. Because alkali metal salts of the sulfoxylates derived from formaldehyde, particularly the sodium salt, are readily available, the present invention will be described in terms of this compound, $HOCH_2SO_2Na$. In addition, ammonium and amino salts thereof can also be employed. These compounds can be prepared by a variety of methods including:

(1) The reduction of sodium formaldehyde bisulfite:

$$HOCH_2SO_3Na + H_2 \rightarrow HOCH_2SO_2Na + H_2O$$

(2) The reaction of formaldehyde with sodium hydrosulfite in the presence of caustic soda:

$$Na_2S_2O_4 + CH_2O(aq.) + NaOH$$
$$\rightarrow HOCH_2SO_2Na + Na_2SO_3$$

(3) The reaction of formaldehyde with sodium hydrosulfite in aqueous solution to form equimolar quantities of sodium formaldehyde sulfoxylate and sodium formaldehyde bisulfite, often referred to as "sodium formaldehyde hydrosulfites."

(4) The reaction of zinc, formaldehyde, and sulfur dioxide are at 80° C., followed by reaction with NaOH to yield a reducing composition of this type.

Water flood and waste disposal operations are too well known to require further elaboration. In essence, in the present process, the flooding operation is effected in the conventional manner except that the flooding medium contains a minor amount of the reducing compound, sufficient to prevent corrosion, in concentrations of about 1 p.p.m. to 1000 p.p.m., or more, for example 1–25 p.p.m., but preferably 1–10. The upper limiting amount of reducing compounds is determined by economic considerations. Since the success of a water flooding operation manifestly depends upon its total cost being less than the value of the additional oil recovered from the oil reservoir, it is quite important to use as little as possible of these reducing compounds consistent with optimum corrosion inhibition. Optimum performance is generally obtained employing 5–10 p.p.m. Since these compounds are themselves inexpensive and are used in low concentrations, they enhance the success of a flood operation by lowering the cost thereof.

In addition, these reducing compounds are effective corrosion inhibitors in the presence of both strong acids and strong bases providing the electrode potential of the system has an E.M.F of not less than about $-400$, but preferably not less than about $-300$, with an optimum E.M.F. of $-300$ to $-100$. They are not sensitive to oxygen content of the water and these are effective corrosion inhibitors in both open water flooding systems and closed water flooding systems. In general, they are not antagonistic to most bactericides or other components of the water flood medium. In addition, solutions of these compounds are filterable through diatomaceous earth in contrast to many of the amino-containing corrosion inhibitors which are absorbed therein.

The following examples are presented for purposes of example and not of limitation.

Examples

The reducing compositions of this invention were actually tested in a field operation on a water flood project located in Kentucky.

The flooding operation was carried out in the conventional manner except that the flooding medium contained 6 p.p.m. of sodium formaldehyde sulfoxylate. Flooding operations were carried out employing 6,000 barrels of water per day. By employing 6 p.p.m. of sodium formaldehyde sulfoxylate in the flooding medium (added as a 25% aqueous solution) the average leak rate (average leaks per day) was decreased from a leak rate of 0.282 leak, employing the best commercial corrosion inhibitor previously tested for the field, to a leak rate of 0.

Sodium formaldehyde sulfoxylate (6 p.p.m.) gave similar results in a water flood project in Illinois.

While the flooding medium employed in accordance with the present invention contains water or oil field brine and the reducing compounds, the medium may also contain other materials. For example, the flooding medium may also contain other agents such as surface active agents or detergents which aid in wetting throughout the system and also promote the desorption of residual oil from the formation, sequestering agents which prevent the deposition of calcium and/or magnesium compounds in the interstices of the formation, bactericides which prevent the formation from becoming plugged through bacterial growth, tracers, etc. Similarly, they may be employed in conjunction with any of the operating techniques commonly employed in water flooding and water disposal processes, for example five spot flooding, peripheral flooding, etc. and in conjunction with other secondary recovery methods.

Having thus described my invention, what I claim as new and desire to obtain by Letters Patent is:

1. A process of preventing corrosion of ferrous metals in systems containing said ferrous metals exposed to a corrosive aqueous medium characterized by employing therein a compound selected from the group consisting of an aldehyde sulfoxylate and a salt thereof.
2. The process of claim 1 wherein the reducing compound is a water soluble salt of an aldehyde sulfoxylate.
3. The process of claim 2 wherein the reducing compound is a water soluble salt of a formaldehyde sulfoxylate.
4. The process of claim 3 wherein the reducing compound is sodium formaldehyde sulfoxylate.
5. The process of claim 4 wherein the concentration of sodium formaldehyde sulfoxylate is 1–1000 p.p.m.
6. The process of claim 5 wherein the concentration of sodium formaldehyde sulfoxylate is 5–10 p.p.m.
7. A process of preventing corrosion of metals in water flooding and water disposal systems which is characterized by injecting into an underground formation an aqueous solution of a compound selected from the group consisting of an aldehyde sulfoxylate and a salt thereof.
8. The process of claim 7 wherein the reducing compound is a water-soluble salt of an aldehyde sulfoxylate.
9. The process of claim 8 wherein the reducing compound is a water soluble salt of a formaldehyde sulfoxylate.
10. The process of claim 9 wherein the reducing compound is sodium formaldehyde sulfoxylate.
11. The process of claim 10 wherein the concentration of sodium formaldehyde sulfoxylate is 1–1000 p.p.m.
12. The process of claim 11 wherein the concentration of sodium formaldehyde sulfoxylate is 5–10 p.p.m.
13. A brine containing (1) a compound in a corrosion inhibiting amount selected from the group consisting of an aldehyde sulfoxylate and a salt thereof, and (2) a brine.
14. The brine composition of claim 13 wherein the corrosion inhibitor is a water-soluble salt of an aldehyde sulfoxylate.
15. The brine composition of claim 14 wherein the corrosion inhibitor is a water soluble salt of a formaldehyde sulfoxylate.
16. The brine composition of claim 15 wherein the corrosion inhibitor is sodium formaldehyde sulfoxylate.
17. The brine composition of claim 16 wherein the concentration of sodium formaldehyde sulfoxylate is 1–1000 p.p.m.
18. The brine composition of claim 17 wherein the concentration of sodium sulfoxylate is 5–10 p.p.m.

References Cited in the file of this patent

UNITED STATES PATENTS

| | | |
|---|---|---|
| 793,559 | Bazlen et al. | June 27, 1905 |
| 2,426,318 | Menaul | Aug. 26, 1947 |
| 2,733,206 | Prusick et al. | Jan. 31, 1956 |

OTHER REFERENCES

Walker: Formaldehyde, 2nd ed., pub. 1953, by Reinhold Pub. Co., N.Y., pages 194, 195 and 489.